United States Patent [19]

Hamilton

[11] Patent Number: 5,706,637
[45] Date of Patent: Jan. 13, 1998

[54] HUMAN POWER MOWER

[76] Inventor: Albert Hamilton, 3516 Cortez, Dallas, Tex. 75220

[21] Appl. No.: 653,490

[22] Filed: May 24, 1996

[51] Int. Cl.[6] ................................. A01D 34/77
[52] U.S. Cl. .................. 56/1; 56/14.8; 56/DIG. 6
[58] Field of Search ................ 56/1, 2, 14.8, 249, 56/DIG. 3, DIG. 6

[56] References Cited

U.S. PATENT DOCUMENTS

| | | | |
|---|---|---|---|
| 1,049,190 | 12/1912 | Anderson | 56/14.8 |
| 1,713,396 | 5/1929 | Roundtree | 56/249 X |
| 5,274,987 | 1/1994 | Wiener | 56/14.8 |

Primary Examiner—Terry Lee Melius
Assistant Examiner—Heather Shackelford
Attorney, Agent, or Firm—Michael I. Kroll

[57] ABSTRACT

A human power mower (10) comprising a mower housing (12). Four mower wheel assemblies (14) are provided. Each mower wheel assembly (14) is affixed in a rotatable manner to one side corner of the mower housing (12). A mower handle (16) extends upwardly at an angle from the mower housing (12), so that a person (18) can grip the mower handle (16). A mower blade (20) is also provided. An assembly (22) is for mounting the mower blade (20) in a rotatable manner centrally to the underside of the mower housing (12). A structure is coupled between the mower wheel assemblies (14) and the mower blade (20), for rotating the mower blade (20) to cut grass (26), when the person (18) pushes the mower (10) by the mower handle (16), to roll along a lawn (28) on the mower wheel assemblies (14).

21 Claims, 4 Drawing Sheets

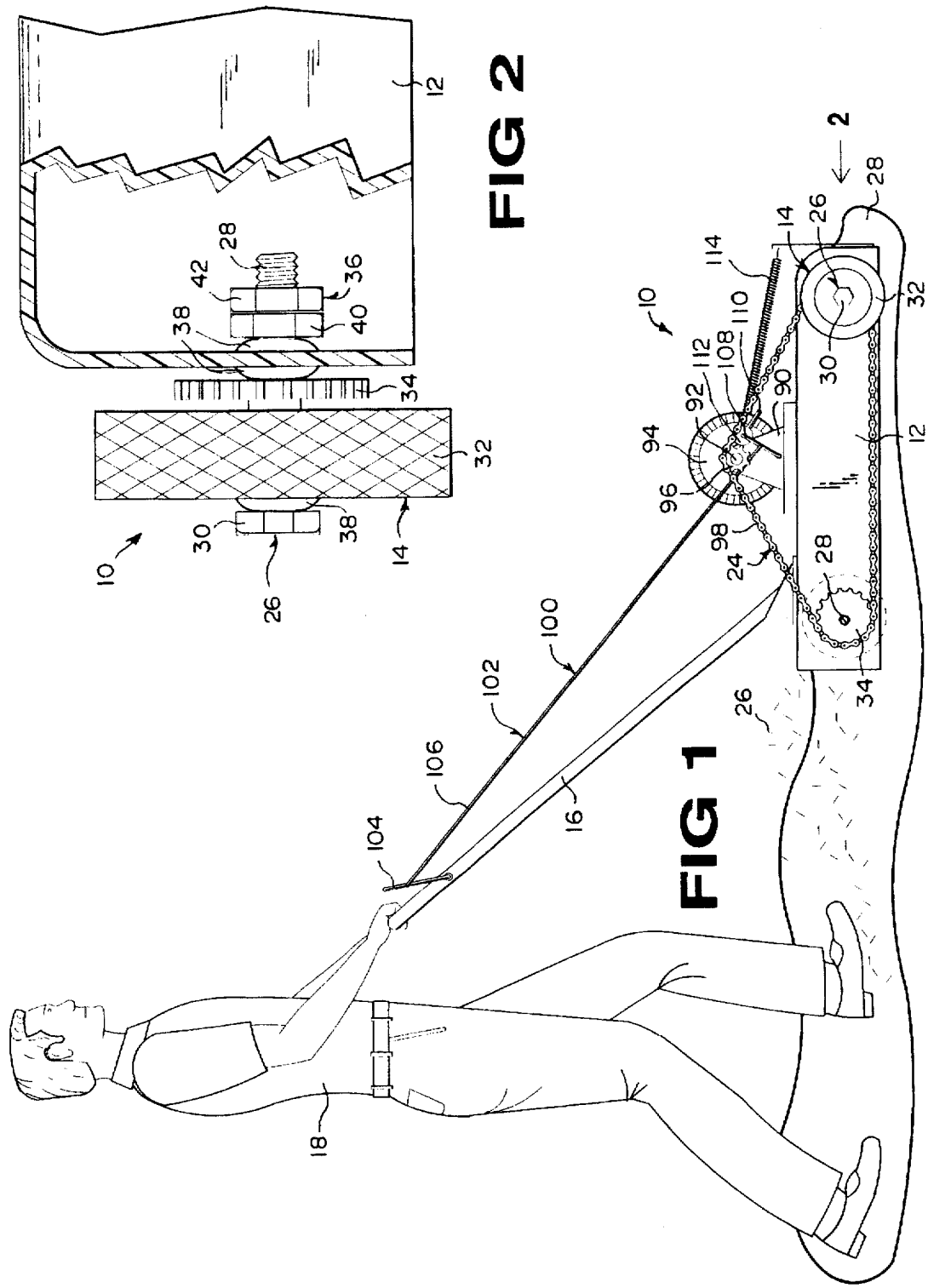

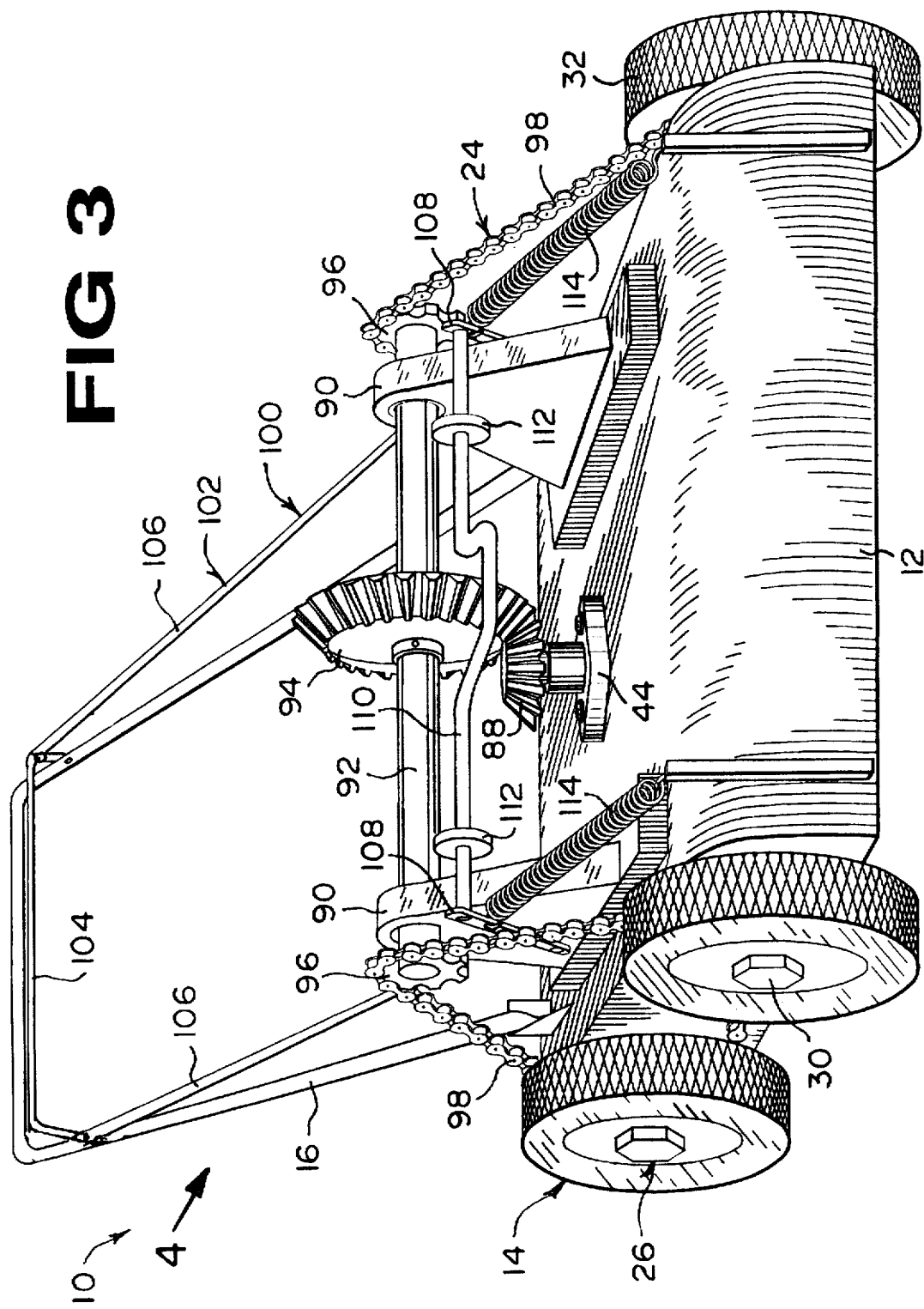

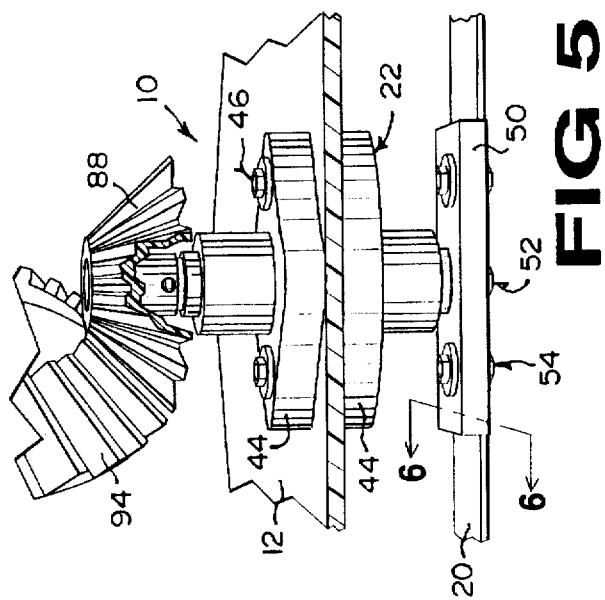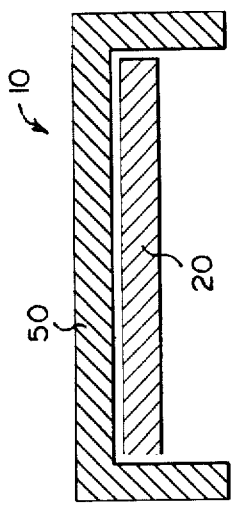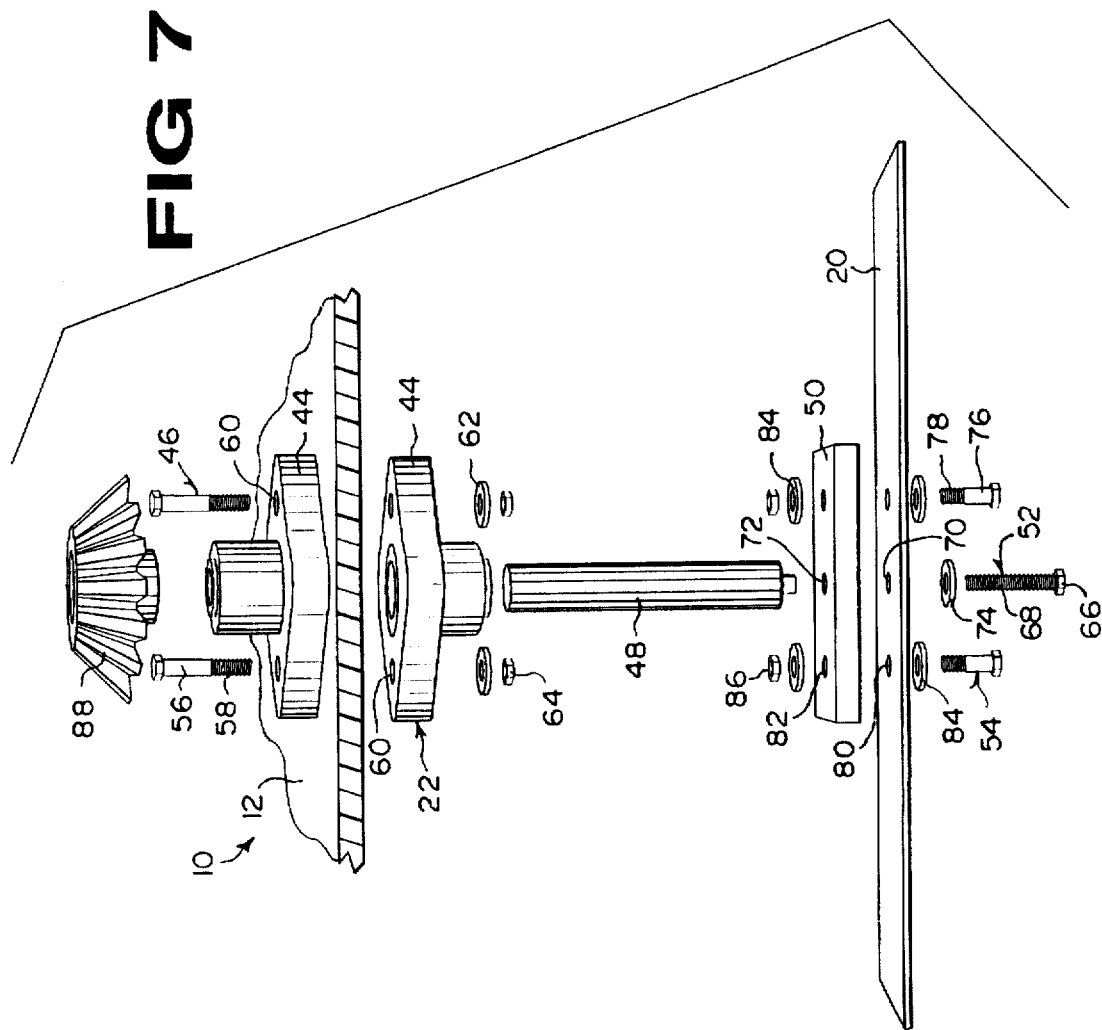

5,706,637

HUMAN POWER MOWER

DESCRIPTION OF THE PRIOR ART

Numerous lawn power mowers have been provided in prior art that are adapted to utilize gasoline engines to rotate blades to slice off grass on lawns. While these units may be suitable for the particular purpose to which they address, they would not be as suitable for the purposes of the present invention as heretofore described.

SUMMARY OF THE INVENTION

A primary object of the present invention is to provide a human power mower that will overcome the shortcomings of the prior art devices.

Another object is to provide a human power mower that uses no energy, other than human, to operate gears and sprockets in the mower to cut grass, thereby releasing no pollutants into the atmosphere.

An additional object is to provide a human power mower that saves fuel energy, since the power to operate the mower is human power, which will maintain a normal yard with ease and very little effort.

A further object is to provide a human power mower that is simple and easy to use.

A still further object is to provide a human power mower that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 is a side view of the instant invention with a rear mower wheel removed, showing a person operating the mower.

FIG. 2 is an enlarged front view taken in the direction of arrow 2 in FIG. 1, with parts broken away and in section, showing the mower wheel assembly in greater detail.

FIG. 3 is a front perspective view of the instant invention.

FIG. 5 is an enlarged perspective view of the area indicated by arrow 5 in FIG. 4.

FIG. 6 is a further enlarged cross sectional view taken along line 6—6 in FIG. 5, showing the profile of the blade mounting plate in greater detail.

FIG. 7 is an exploded perspective view of the various components assembled in FIG. 5.

Similar reference characters denote corresponding features consistently throughout the attached drawings.

DETAILED DESCRIPTION OF THE PREFERRED EMBODIMENTS

Figure 4:
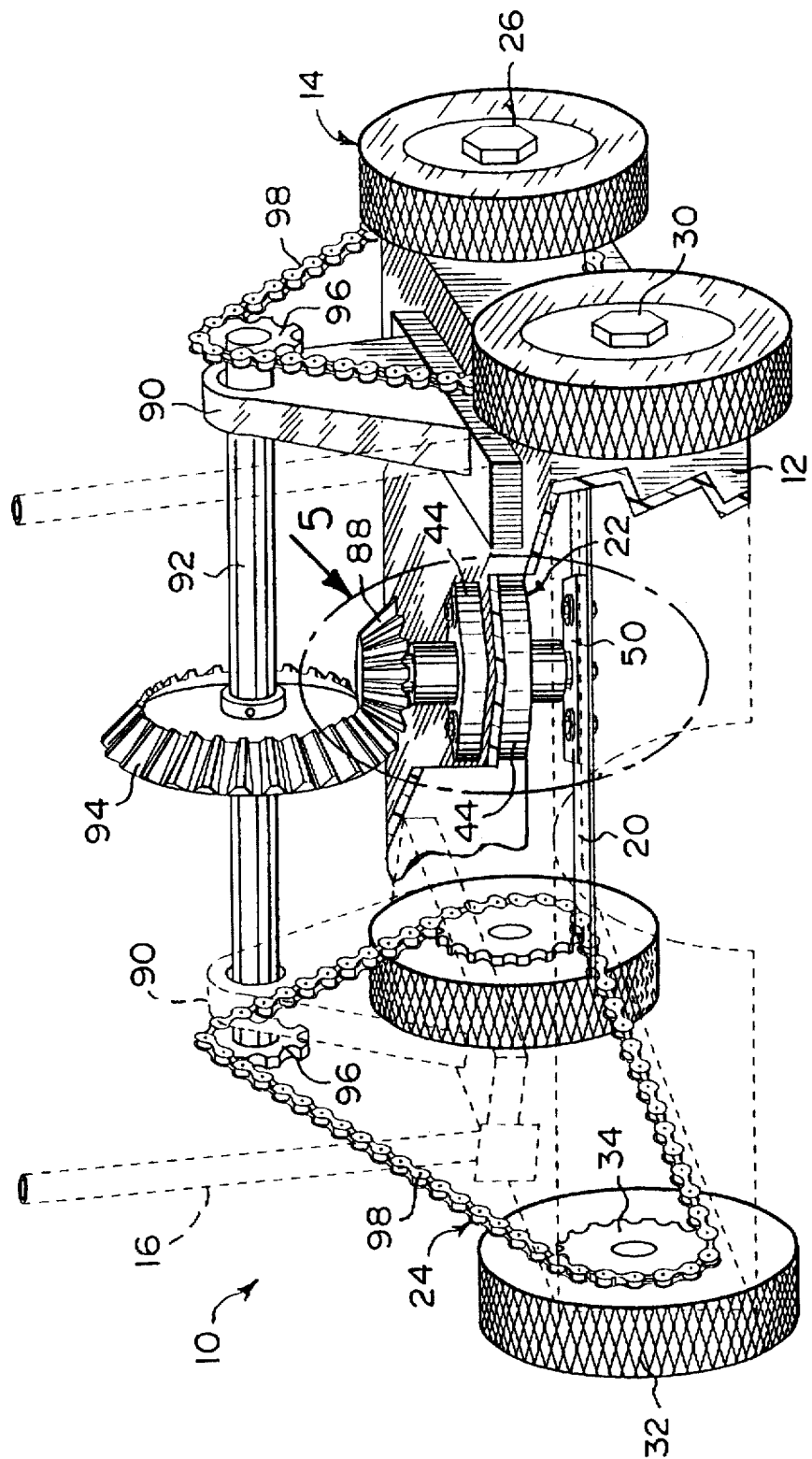
FIG. 4 is a rear perspective view taken in the direction of arrow 4 in FIG. 3, with parts broken away, in section and in phantom.

Turning now descriptively to the drawings, in which similar reference characters denote similar elements throughout the several views, FIGS. 1 through 7 illustrate a human power mower 10 comprising a mower housing 12. Four mower wheel assemblies 14 are provided. Each mower wheel assembly 14 is affixed in a rotatable manner to one side corner of the mower housing 12. A mower handle 16 extends upwardly at an angle from the mower housing 12, so that a person 18 can grip the mower handle 16. A mower blade 20 is also provided. An assembly 22 is for mounting the mower blade 20 in a rotatable manner centrally to the underside of the mower housing 12. A structure 24 is coupled between the mower wheel assemblies 14 and the mower blade 20, for rotating the mower blade 20 to cut grass 26, when the person 18 pushes the mower 10 by the mower handle 16, to roll along a lawn 28 on the mower wheel assemblies 14.

Each mower wheel assembly 14, as best seen in FIG. 2, includes a stove bolt 26 having a threaded shank 28 and enlarged head 30. A mower wheel 32 is included. A wheel sprocket 34 is affixed to one side of the mower wheel 32. Components 36 are for securing the threaded shank 28 of the stove bolt 26, which extends through a hole in the side corner of the mower housing 12. The mower wheel 32 with the wheel sprocket 34 can rotate upon the stove bolt 26 behind the enlarged head 30.

The securing components 36 consist of three concave washers 38 carried on the threaded shank 28. The first concave washer 38 is between the enlarged head 30 and the mower wheel 32. The second concave washer 38 is between the wheel sprocket 34 and an outer surface of the side corner of the mower housing 12. The third concave washer 38 is at an inner surface of the side corner of the mower housing 12. A lock nut 40 is threaded on the threaded shank 28 against the third concave washer 38. A bolt nut 42 is threaded on the threaded shank 28 against the lock nut 40.

The mower blade mounting assemblage 22, as best seen in FIG. 7, comprises a pair of flange bearings 44. A facility 46 is for attaching the first flange bearing 44 to an upper surface of the mower housing 12 and the second flange bearing 44 to a lower surface of the mower housing 12 directly below the first flange bearing 44. A drive shaft 48 extends through the pair of flange bearings 44 in a rotatable manner. A C-shaped blade mounting channel plate 50 is provided. A facility 52 is for securing the C-shaped blade mounting channel plate 50 transversely to a bottom end of the drive shaft 48. A facility 54 is for securing the mower blade 20 to the C-shaped blade mounting channel plate 50.

The flange bearing attaching facility 46 includes a pair of bolts 56. Each bolt 56 has a threaded shank 58 that extends through apertures 60 in the flange bearings 44 and apertures in mower housing 12. A pair of lock washers 62 are provided. Each lock washer 62 fits onto one threaded shank 58. A pair of nut 64 are also provided. Each nut 64 is threaded onto one threaded shank 58.

The C-shaped blade mounting channel plate securing facility 52 consists of a bolt 66 having a threaded shank 68, which extends through a central aperture 70 in the mower blade 20, a central aperture 72 in the C-shaped blade mounting channel plate 50 and then threads into a threaded bore at the bottom end of the drive shaft 48. A lock washer 74 fits onto the threaded shank 68 of the bolt 66 below the mower blade 20.

The mower blade securing facility 54 comprises a pair of bolts 76. Each bolt 76 has a threaded shank 78 that extends through an aperture 80 in the mower blade 20 and an aperture 82 in the C-shaped blade mounting channel plate 50. Four lock washers 84 are provided. Two lock washers 84 fit onto one threaded shank 78 of one bolt 76, whereby one lock washer 84 is below the mower blade 20, while the other lock washer 84 is above the C-shaped blade mounting channel plate 50. Two nuts 86 are also provided. Each nut 86 is threaded onto one threaded shank 78 of the bolt 76.

The mower blade rotating structure 24 includes a small bevel pinion 88 affixed to a top end of the drive shaft 48. A pair of pillar blocks 90 are spaced apart and mounted to the upper surface of the mower housing 12 at opposite sides thereof. A gear shaft 92 has opposite ends carried in the pillar blocks 90 in a rotatable manner. A large bevel gear 94 is affixed to the gear shaft 92 and is in engagement with the small pinion 88. A pair of shaft sprockets 98 are provided. Each shaft sprocket 96 is affixed to one end of the gear shaft 92. A pair of continuous drive chains 98 are also provided. Each drive chain 98 extends about one shaft sprocket 96 and two wheel sprockets 34.

The human power mower 20, as shown in FIGS. 1 and 3, can further contain an apparatus 100 for slowing down the mower blade rotating structure 24, to allow the person 18 pushing the mower 10 to easily maneuver the mower 10 in a turn. The slowing down apparatus 100 is a hand operated brake mechanism 102 connected thereto. The brake mechanism 102 includes a brake handle 104 pivotally mounted near a top end of the mower handle 16. A pair of brake arms 106 are provided. Each brake arm 106 is pivotally connected to and extends from the brake handle 104 towards the upper surface of the mower housing 12.

A pair of brake swing levers 108 are also provided. Each brake swing lever 108 is pivotally connected to one pillar block 90 and one brake arm 106. A brake shaft 110 has opposite ends connected to the brake swing levers 108. A pair of brake wheels 112 are on the brake shaft 110, which will bear against the gear shaft 92 when the brake handle 104 is pulled back by the person 18. A pair of springs 114 are provided. Each spring 114 is affixed between one brake swing lever 108 and a forward end of the mower housing 12. When the person 18 releases the brake handle 104, the springs 114 will pull the brake swing levers 108 to move the brake shaft 110 with the brake wheels 112 away from the gear shaft 92.

LIST OF REFERENCE NUMBERS 10 human power mower
12 mower housing of 10
14 mower wheel assembly of 10
16 mower handle of 10
18 person
20 mower blade of 10
22 mower blade mounting assemblage of 10
24 mower blade rotating structure of 10
26 stove bolt of 14
28 threaded shank of 26
30 enlarged head of 26
32 mower wheel of 14
34 wheel sprocket of 14
36 securing components of 14
38 concave washer of 36
40 lock nut of 36
42 bolt nut of 36
44 flange bearing of 22
46 flange bearing attaching facility of 22
48 drive shaft of 22
50 C-shaped blade mounting channel plate of 22
52 C-shaped blade mounting channel plate securing facility of 22
54 mower blade securing facility of 22
56 bolt of 46
58 threaded shank of 56
60 aperture in 44
62 lock washer of 46
64 nut of 46
66 bolt of 52
68 threaded shank of 66
70 central aperture in 20
72 central aperture in 50
74 lock washer of 52
76 bolt of 54
78 threaded shank of 76
80 aperture in 20
82 aperture in 50
84 lock washer of 54
86 nut of 54
88 small bevel pinion of 24
90 pillar block of 24
92 gear shaft of 24
94 large bevel gear on 92 of 24
96 shaft sprocket on 92 of 24
98 continuous drive chain of 24
100 slowing down apparatus in 20
102 hand operated brake mechanism for 100
104 brake handle of 102
106 brake arm of 102
108 brake swing lever of 102
110 brake shaft of 102
112 brake wheel of 102 on 110

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A human power mower comprising:

a) a mower housing;

b) four mower wheel assemblies, in which each said mower wheel assembly is affixed in a rotatable manner to one side corner of said mower housing;

c) a mower handle extending upwardly at an angle from said mower housing, so that a person can grip said mower handle;

d) a mower blade;

e) means for mounting said mower blade in a rotatable manner centrally to the underside of said mower housing; and f) means coupled between each of said mower wheel assemblies and said mower blade, for rotating said mower blade to cut grass, when the person pushes said mower by said mower handle, to roll along a lawn on said mower wheel assemblies.

2. A human power mower as recited in claim 1, wherein each said mower wheel assembly includes:
   a) a stove bolt having a threaded shank and enlarged head;
   b) a mower wheel;
   c) a wheel sprocket affixed to one side of said mower wheel; and
   d) means for securing said threaded shank of said stove bolt which extends through a hole in said side corner of said mower housing, so that said mower wheel with said wheel sprocket can rotate upon said stove bolt.

3. A human power mower as recited in claim 2, wherein said securing means includes:
   a) three concave washers carried on said threaded shank, in which said first concave washer is between said enlarged head and said mower wheel, said second concave washer is between said wheel sprocket and an outer surface of said side corner of said mower housing, while said third concave washer is at an inner surface of said side corner of said mower housing;
   b) a lock nut threaded on said threaded shank against said third concave washer; and
   c) a bolt nut threaded on said threaded shank against said lock nut.

4. A human power mower as recited in claim 1, wherein said mower blade mounting means includes:
   a) first and second flange bearings;
   b) means for attaching said first flange bearing to an upper surface of said mower housing and said second flange bearing to a lower surface of said mower housing directly below said first flange bearing;
   c) a drive shaft extending through said pair of flange bearings in a rotatable manner;
   d) a C-shaped blade mounting channel plate;
   e) means for securing said C-shaped blade mounting channel plate transversely to a bottom end of said drive shaft; and
   f) means for securing said mower blade to said C-shaped blade mounting channel plate.

5. A human power mower as recited in claim 4, wherein said flange bearing attaching means includes:
   a) a pair of bolts, in which each said bolt having a threaded shaft extends through apertures in said flange bearings and apertures in said mower housing;
   b) a pair of lock washers, in which each said lock washer fits onto one said threaded shank; and
   c) a pair of nuts, in which each said nut is threaded onto one said threaded shank.

6. A human power mower as recited in claim 4, wherein said C-shaped blade mounting channel plate securing means includes:
   a) a bolt having a threaded shank, which extends through a central aperture in said mower blade, a central aperture in said C-shaped blade mounting channel plate and then threads into a threaded bore at said bottom end of said drive shaft; and
   b) a lock washer which fits onto said threaded shank of said bolt below said mower blade.

7. A human power mower as recited in claim 4, wherein said mower blade securing means includes:
   a) a pair of bolts, in which each said bolt having a threaded shank extends through an aperture in said mower blade and an aperture in said C-shaped blade mounting channel plate;
   b) four lock washers, in which two said lock washers fit onto one said threaded shank of one said bolt, whereby one said lock washer is below said mower blade, while other said lock washer is above said C-shaped blade mounting channel plate; and
   c) two nuts, in which each said nut is threaded onto one said threaded shank of said bolt.

8. A human power mower as recited in claim 1, wherein said mower blade rotating means includes:
   a) a small bevel pinion affixed to a top end of said drive shaft;
   b) a pair of pillar blocks spaced apart and mounted to said upper surface of said mower housing at opposite sides thereof;
   c) a gear shaft having opposite ends carried in said pillar blocks in a rotatable manner;
   d) a large bevel gear affixed to said gear shaft and in engagement with said small pinion;
   e) a pair of shaft sprockets, in which each said shaft sprocket is affixed to one end of said gear shaft; and
   f) a pair of continuous drive chains, in which each said drive chain extends about one said shaft sprocket and two said wheel sprockets.

9. A human power mower as recited in claim 8, further including means for slowing down said mower blade rotating means, to allow the person pushing said mower to easily maneuver said mower in a turn.

10. A human power mower as recited in claim 9, wherein said slowing down means includes a hand operated brake mechanism connected thereto.

11. A human power mower as recited in claim 10, wherein said brake mechanism includes:
   a) a brake handle pivotally mounted near a top end of said mower handle;
   b) a pair of brake arms, in which each said brake arm is pivotally connected to and extends from said brake handle towards an upper surface of said mower housing;
   (c) a pair of brake swing levers, in which each said brake swing lever is pivotally connected to one said pillar block and one said brake arm;
   d) a brake shaft having opposite ends connected to said brake swing levers;
   e) a pair of brake wheels on said brake shaft, which will bear against said gear shaft when said brake handle is pulled back by the person; and
   f) a pair of springs, in which each said spring is affixed between one said brake swing lever and a forward end of said mower housing, so that when the person releases said brake handle said springs will pull said brake swing levers to move said brake shaft with said brake wheels away from said gear shaft.

12. A human power mower comprising:
   a) a mower housing;
   b) four mower wheel assemblies, in which each said mower wheel assembly is affixed in a rotatable manner to one side corner of said mower housing;
   c) a mower handle extending upwardly at an angle from said mower housing, so that a person can grip said mower handle;
   d) a mower blade;
   e) means for mounting said mower blade in a rotatable manner centrally to the underside of said mower housing; and f) means coupled between each of said mower wheel assemblies and said mower blade, for rotating said mower blade to cut grass, when the person pushes said mower by said mower handle, to roll along a lawn on said mower wheel assemblies; and g) means for slowing down said mower blade rotating means, to allow the person pushing said mower to easily maneuver said mower in a turn.

13. A human power mower as recited in claim 12, wherein each said mower wheel assembly includes:

a) a stove bolt having a threaded shank and enlarged head;

b) a mower wheel;

c) a wheel sprocket affixed to one side of said mower wheel; and d) means for securing said threaded shank of said stove bolt which extends through a hole in said side corner of said mower housing, so that said mower wheel with said wheel sprocket can rotate upon said stove bolt.

14. A human power mower as recited in claim 13, wherein said securing means includes:

a) three concave washers carried on said threaded shank, in which said first concave washer is between said enlarged head and said mower wheel, said second concave washer is between said wheel sprocket and an outer surface of said side corner of said mower housing, while said third concave washer is at an inner surface of said side corner of said mower housing;

b) a lock nut threaded on said threaded shank against said third concave washer; and c) a bolt nut threaded on said threaded shank against said lock nut.

15. A human power mower as recited in claim 14, wherein said mower blade mounting means includes:

a) first and second flange bearings;

b) means for attaching said first flange bearing to an upper surface of said mower housing and said second flange bearing to a lower surface of said mower housing directly below said first flange bearing;

c) a drive shaft extending through said pair of flange bearings in a rotatable manner;

d) a C-shaped blade mounting channel plate;

e) means for securing said C-shaped blade mounting channel plate transversely to a bottom end of said drive shaft; and f) means for securing said mower blade to said C-shaped blade mounting channel plate.

16. A human power mower as recited in claim 15, wherein said flange bearing attaching means includes:

a) a pair of bolts, in which each said bolt having a threaded shaft extends through apertures in said flange bearings and apertures in said mower housing;

b) a pair of lock washers, in which each said lock washer fits onto one said threaded shank; and c) a pair of nuts, in which each said nut is threaded onto one said threaded shank.

17. A human power mower as recited in claim 16, wherein said C-shaped blade mounting channel plate securing means includes:

a) a bolt having a threaded shank, which extends through a central aperture in said mower blade, a central aperture in said C-shaped blade mounting channel plate and then threads into a threaded bore at said bottom end of said drive shaft; and b) a lock washer which fits onto said threaded shank of said bolt below said mower blade.

18. A human power mower as recited in claim 17, wherein said mower blade securing means includes:

a) a pair of bolts, in which each said bolt having a threaded shank extends through an aperture in said mower blade and an aperture in said C-shaped blade mounting channel plate;

b) four lock washers, in which two said lock washers fit onto one said threaded shank of one said bolt, whereby one said lock washer is below said mower blade, while other said lock washer is above said C-shaped blade mounting channel plate; and c) two nuts, in which each said nut is threaded onto one said threaded shank of said bolt.

19. A human power mower as recited in claim 18, wherein said mower blade rotating means includes:

a) a small bevel pinion affixed to a top end of said drive shaft;

b) a pair of pillar blocks spaced apart and mounted to said upper surface of said mower housing at opposite sides thereof;

c) a gear shaft having opposite ends carried in said pillar blocks in a rotatable manner;

d) a large bevel gear affixed to said gear shaft and in engagement with said small pinion;

e) a pair of shaft sprockets, in which each said shaft sprocket is affixed to one end of said gear shaft; and f) a pair of continuous drive chains, in which each said drive chain extends about one said shaft sprocket and two said wheel sprockets.

20. A human power mower as recited in claim 19, further including means for slowing down said mower blade rotating means, to allow the person pushing said mower to easily maneuver said mower in a turn.

21. A human power mower as recited in claim 20, wherein said slowing down means includes a hand operated brake mechanism connected thereto.

* * * * *